Jan. 9, 1951 — C. O'DANIEL — 2,537,600
PACKING FREE OIL SEAL
Filed Nov. 20, 1946
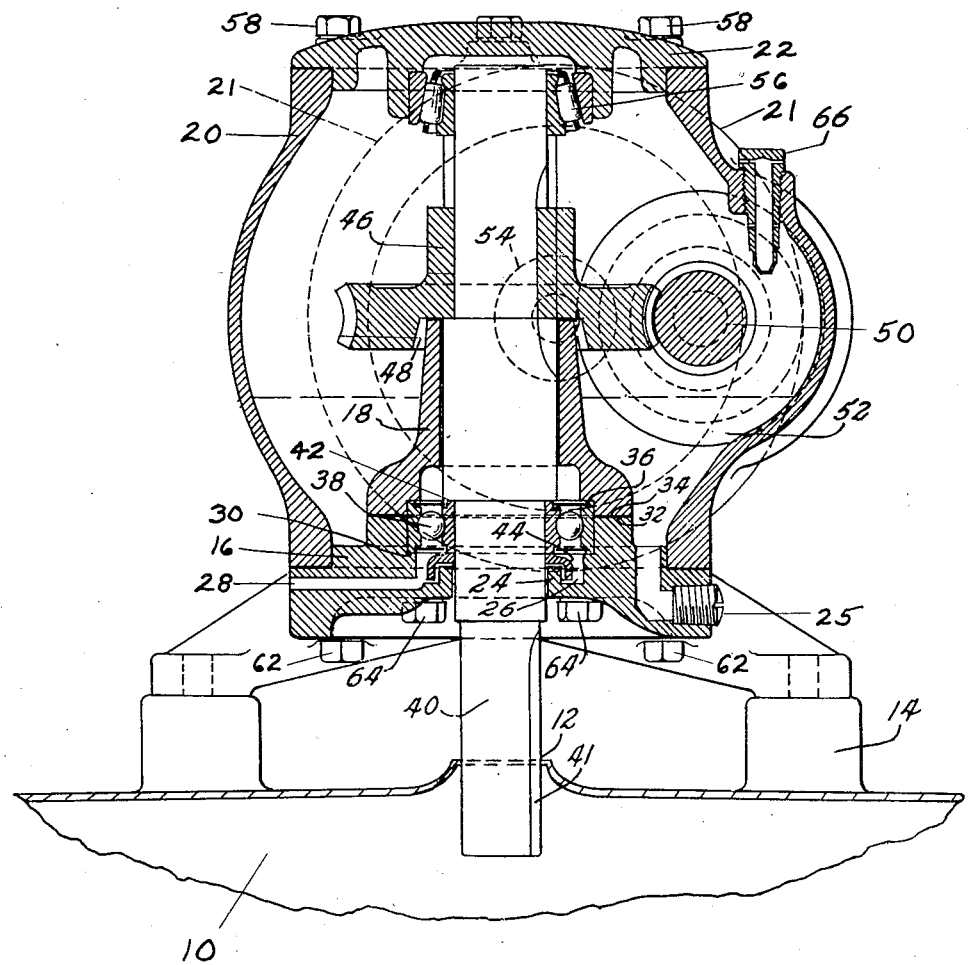
INVENTOR.
CLARENCE O'DANIEL
BY
Roy M. Eilers
ATTORNEY Patented Jan. 9, 1951

2,537,600

UNITED STATES PATENT OFFICE 2,537,600

PACKING FREE OIL SEAL

Clarence O'Daniel, Richmond Heights, Mo., assignor to Century Electric Company, a corporation of Missouri Application November 20, 1946, Serial No. 711,102

2 Claims. (Cl. 286—5)

This invention relates to improvements in dynamoelectric machines. More particularly, this invention relates to improvements in methods and apparatus for preventing leakage of oil along vertically disposed shafts that are driven by dynamoelectric machines and are used in the food industry.

It is, therefore, an object of the present invention to provide an improved method and apparatus for preventing leakage of oil along vertically-disposed shafts used in the food industry.

In certain sections of the food industry, as for example in dairies and related businesses certain fluids and semi-solids must be agitated. During the course of such agitation, it is very important that no undesirable materials become admixed with those fluids or semi-solids; one material that definitely must be kept out of those fluids or semi-solids is lubricating oil. If only one or two drops of lubricating oil were to fall into a vat of milk, the milk would take on a flavor that would destroy the commercial value of the milk and make it quite unsalable. As a result, it has become the practice in some sections of the food industry to place the fluids and semi-solids in large vats or containers that are provided with covers which are intended to keep out lubricating oils and other adulterants. In the main these covers have operated to keep out most adulternats but since the covers are provided with openings that surround the shaft, lubricating oil can sometimes leak down along the shaft and pass through the openings in the covers. Consequently, even though many dynamoelectric machines and the gear trains of those machines are built so they are almost drip-free, those machines are not as desirable as they should be because one drop of oil can make the entire contents of a vat unsalable. As a result, it is necessary to provide a dynamoelectric machine and connected gear train that positively guard against the leakage of even one drop of oil along the shaft passing through the cover. The present invention does this by providing a new and improved oil seal for vertically-disposed rotating shafts. It is, therefore, an object of the present invention to provide an improved oil seal for vertically-disposed shafts that prevents leakage of oil along the shafts.

In some oil seals that are usable with dynamoelectric machines, it is customary to provide an oil slinger on the shaft; that slinger can act to develop such large centrifugal forces in the oil which passes along the shaft to the slinger that such oil will be thrown outwardly into cavities adjacent the outer periphery of the slinger. That oil will then flow down to the bottom of the cavities where a conduit is located, and that conduit will return the oil to the reservoir where it can be held instantly available for lubricating purposes. While it is conceivable that an oil slinger could be used with a rapidly rotating, vertically-disposed shaft to prevent oil from leaking along that shaft, such a slinger would not be feasible with the slow-moving shafts of the food industry, because the slow rotation of those shafts would not enable the slinger to develop the centrifugal force in the oil that is required to force the oil off of the slinger. In other oil seals that are used with dynamoelectric machines, it is customary to maintain a quantity of oil-absorbent material adjacent to and in contact with the shaft and that material is supposed to be able to absorb oil leaking along the shaft. However, that material can become soaked with oil or can draw away from the shaft and in either case it can permit oil to leak down along the shaft and through the opening in the cover. For these reasons, dynamoelectric machines that depend on oil slingers on the shaft or oil absorbent material adjacent the shaft to prevent passage of oil along the shaft are objectionable. The present invention obviates these objections by providing an oil seal for rotating shafts that operates independently of the speed of the shaft to provide positive protection against oil leakage along the shaft.

The present invention obtains this desirable result by providing an upstanding annular projection that surrounds a vertically-disposed shaft and substantially isolates that shaft from contact with the lubricant for the gear on the shaft. The projection has its upper end disposed in a gear housing that is connected with the dynamoelectric machines and it has its upper end located above the level of the lubricant in that gear housing. As a result, the lubricant is denied ready access to the shaft. In addition, the present invention provides a gear or other rotating element that is secured to the shaft and is positioned closely adjacent the upper end of the annular projection so as to keep oil from splashing freely against the portion of the shaft which extends above the top of the annular projection. This arrangement additionally guarantees that oil cannot contact the shaft and pass down between the shaft and the projection until it reaches the opening in the cover on the vat which contains the fluids or semi-solids being agitated. In addition, by providing the gear or other rotating element on the shaft with a concavity that receives the upper end of the annular projection, the present invention obviates any straight-line path to the shaft, thus shielding the shaft from virtually all contact with the oil used to lubricate the gears in the gear housing. It is, therefore, an object of the present invention to provide a concavity in the under surface of a gear or other rotating element that is supported by a vertically-disposed shaft and to telescope that concavity over an annular projection surrounding the shaft, thus obviating straight-line paths to the shaft.

In addition to this construction, the present invention provides an oil-distributing shield that is intermediate the oil reservoir and the lower end of the shaft, and is below the lower bearing of the shaft, and that shield is sealed to the shaft in such a way that no oil can pass between the shield and the shaft. This shield is held adjacent a recess that has a shoulder which extends up beneath the shield and keeps oil that is discharged from the shield from rising up beneath the shield and contacting the portion of the shaft below the shield. The recess is provided with an outlet that is disposed outwardly from the shaft and conducts any oil from the recess to a point that is distant from the opening in the cover. Moreover, the housing for the shaft is undercut adjacent the outlet so the oil from the outlet cannot, by reason of its surface tension, pass along the surface of the housing to the shaft. It is, therefore, an object of the present invention to provide an oil-carrying shield, adjacent the lower end of a vertically-disposed shaft that extends down over an upstanding shoulder and extends into a recess adjacent the shaft, thus preventing oil from leaking down the shaft and instead directing the oil to an outlet spaced from the opening in the cover of the vat that contains the fluids and semi-solids being agitated.

Other objects and advantages of the present invention should become apparent from an examination of the drawing and accompanying description.

In the drawing and accompanying description, a preferred embodiment of the present invention is shown and described but it is to be understood that the drawing and accompanying description are for the purposes of illustration only and do not limit the invention and that the invention will be defined by the appended claims.

The single drawing of the present invention is a side elevational, cross-sectional view of a gear housing which is supported on a pasteurizer and in turn supports a dynamoelectric machine.

Referring to the drawing in detail, the cover of a pasteurizing device is denoted by the numeral 10 and that cover has a central opening 12 and a number of supporting pedestals 14. It will be noted that the cover 10 has a generally conical or spherical surface which gradually slopes upwardly toward the opening 12 and then rises abruptly to that opening, so any fluid dropped on the cover at a distance from the opening 12 would have to move against the force of gravity to approach the opening 12 and would have to rise very sharply against the force of gravity to reach and enter the opening 12. The pedestals 14 which are spaced outwardly from the opening 12 support a gear housing which includes a bottom casting 16, an annular projection 18, a central section 20, and a cover plate 22. The central section 20 supports a dynamoelectric machine 21 that drives the gears in the gear housing.

The bottom casting 16 is provided with a shoulder 24 which forms the inner periphery of a recess 26 and the recess 26 is provided with an outlet 28. The lower casting 16 is also provided with an annular seat 30 and a smoothly machined mating surface 32 that is vertically spaced a short distance above the annular seat 30. The mating surface 32 receives the smoothly machined mating surface 34 of the annular projection 18, thus providing an oil-tight seal between the lower casting 16 and the annular projection 18. If desired, a sealant or a gasket can be placed between the smoothly machined surface 32 of the casting 16 and the mating surface 34 of the annular projection 18. In addition to the mating surface 34, the annular projection 18 is provided with an annular seat 36 and that seat cooperates with the seat 30 of the casting 16 to receive the outer race of the anti-friction bearing 38. The inner race of the anti-friction bearing 38 is supported by and will rotate with the vertically-disposed shaft 40 that is positioned in and is surrounded by the annular projection 18. The shaft 40 has a shoulder 42 against which the inner race of the anti-friction bearing 38 bears and the anti-friction bearing 38 will be held against the shoulder 42 by the annular shield 44.

The shield 44 is sealed to the shaft 40 by brazing, soldering, welding, press-fitting or other suitable ways and it is secured so intimately to the shaft 40 that no oil can pass between the shield 44 and the shaft 40. Instead, any oil that may happen to leak downwardly along the shaft 40 and pass through the anti-friction bearing 38 will have to move all the way to the outer periphery of the shield 44 before it can resume its downward movement. In its further downward movement, the oil will flow along the downwardly-extending flange-like portion of the shield 44 and thus be held away from the lower portion of the shaft 40 which extends downwardly from the shield 44 and passes through the opening 12 in the cover 10 of the pasteurizer.

The opening 12 in the cover 10 is made just large enough to receive the shaft 40 and to permit that shaft to rotate freely without striking or touching the cover 10. The upper end of the shaft 40 carries a worm wheel 46 which is secured to the shaft 40 in such a way that no oil can pass between said shaft and said worm wheel. The worm wheel 46 is provided with a cavity 48 in the under side thereof and the cavity 48 telescopes down over the upper end of the annular projection 18. The worm wheel 46 engages and is driven by the worm gear 50, which in turn is driven by a worm wheel 52 that engages and is driven by the worm gear 54. The worm gear 54 is mounted on the driving shaft of the motor 21 and the motor 21 is secured to the rear of the central section 20 of the gear housing.

The gear housing has an anti-friction bearing 56 adjacent the upper end of the shaft 40 and that bearing has its outer race secured to and supported by the cover plate 22 of the gear housing, and it has its inner race secured to and rotatable with the shaft 40. Bolts 58 secure the upper casting 22 to the central section 20, bolts 62 secure the lower casting 16 to the central section 20, and bolts 64 secure the annular projection 18 to the lower casting 16. The central section 20 is provided with a vent 66 that permits breathing of air into and out of the housing without any loss of oil and the lower casting 16 is provided with a threaded opening that receives the drain plug 25. As indicated by the dotted line intermediate the top and bottom of the annular projection 18, a supply of lubricant is always maintained in the gear housing and the level of that lubricant will be below the top of the projection 18 but will be above the lower edge of the worm wheel 52 so that worm wheel can pick up the oil and distribute it onto the various gears and shafts in the gear housing.

The construction shown in the drawing provides a double reduction in speed and will permit the shaft 40 to rotate at very slow speeds since the worm gear 54 and the worm wheel 52 cooperate to keep the speed of rotation of the worm gear 50 at a value considerably below the speed of rotation of the worm 54, and the worm gear 50 cooperates with the worm wheel 46 to hold the speed of rotation of the shaft 40 at a value which is very much less than the speed of rotation of the shaft of the motor 21. Since the shaft 40 extends down through the opening 12 in the cover 10, and since it is provided with a keyway 41, agitators or other instruments, not shown, can be attached to the lower end of the shaft 40 and can be used to agitate or otherwise act upon the fluid or semi-solid contents of the pasteurizer.

As the shaft 40 rotates, the gears 46, 50, 52 and 54 will be adequately lubricated and will operate with a marked degree of efficiency since friction will be at an extremely low value. At the same time, however, the contents of the pasteurizer will be fully protected from contact with the oil used to lubricate the various gears. It will be noted that the lower casting 16 cooperates with the central section 20 and the annular projection 18 of the gear housing to provide an oil-tight reservoir that receives and holds lubricant and further it will be noted that this construction keeps oil from directly contacting the portion of the shaft 40 below worm wheel 46. Moreover, it should be noted that if, by reason of the operation of the various gears in the gear housing, any oil is splashed upwardly above the dotted line of the drawing that indicates the oil level, that oil will be able to strike the shaft 40 at points above the worm wheel 46 and will be able to strike the worm gear 46 or the annular projection 18 but it will be unable to strike the portion of the shaft 40 below the worm wheel 46 because the cavity 48 of the worm wheel 46 cooperates with the upper end of the annular projection 18 to prevent a straight-line path to the shaft 40. To reach the shaft 40, the oil would have to bounce against the annular projection 18 or against the surface of the cavity 48 of the worm wheel 46 until it reached the upper end of the annular projection 18 and then it would have to experience a severe and abrupt change of direction, preparatory to passing through the extremely narrow gap between the worm wheel 46 and the upper end of the annular projection 18. In addition, any oil that did happen to enter that gap would be acted upon by the worm wheel 46 and caused to rotate and that rotation would generate some centrifugal force in the oil. That centrifugal force would not be very great because the speed of rotation of the shaft 40 is not very great, but nevertheless, a definite centrifugal force would be created in the oil and that force would urge the oil outwardly and away from the shaft 40. Accordingly, it is extremely unlikely that any oil will be able to pass through the narrow and tortuous path between the worm wheel 46 and the projection 18 and thus it is highly unlikely that any oil can penetrate to and contact the shaft 40. Consequently, a high measure of protection is provided against the possibility of oil contacting and leaking down along the shaft 40.

A further and additional measure of protection against the possibility of oil leaking down along shaft 40 is provided by the shield 44 and the recess 26. If any oil does manage to follow the narrow and tortuous path between annular projection 18 and worm wheel 46 and does manage to contact the shaft 40, that oil will gradually move down to the vicinity of the anti-friction bearing 38. That bearing is provided with metal side plates of annular form, and it is provided with a life-time supply of grease, but it is not intended to keep oil from passing down the shaft 40 and thus any oil reaching the bearing 38 will eventually pass down to the rotating shield 44. As previously indicated, any oil moving down along the shaft 40 cannot possibly pass between the shield 44 and the shaft 40 because of the manner in which the shield 44 is attached to the shaft 40 and therefore that oil will have to move to the outer periphery of the shield 44. Thereafter, that oil will drip to the bottom of the recess 26 where it will be prevented from contacting the shaft 40 by the upstanding shoulder 24 that extends up under the downwardly-extending flange-like portion of the shield 44 and as that oil is gradually moved along the bottom of the recess 26 by the shield 44, it will be moved into the proximity of the outlet 28 and will flow outwardly through that outlet until it falls down onto the cover 10 where it can be wiped away. There is no likelihood or possibility that the oil which issues from the outlet 28 could spread along the under surface of the lower casting 16 and contact the shaft 40, because the under side of the casting 16 is undercut and provides a severe and abrupt change of surface up which the oil would have to climb before it could reach the shaft 40. In addition, because of the force of gravity, there is no likelihood or possibility that the few drops of oil which might, over the course of many hours of operation, fall onto the cover 10 from outlet 28 could spread along the surface of the cover 10 and rise up the very abrupt curved surface adjacent the opening 12 and pass across the gap formed by the opening 12.

As a result, the construction of the present invention positively guarantees that no oil can enter the opening 12 by leaking along the shaft 40. It is extremely unlikely that any oil will pass between the upstanding projection 18 and the worm wheel 46 to contact the shaft 40, but if any oil does happen to do so, that oil will be safely and positively conducted away from the shaft 40 by the shield 44 and will be prevented from passing down the shaft through the opening 12.

Whereas a preferred embodiment of the present invention has been shown and described in the drawing and accompanying description, it should be obvious to those skilled in the art that various changes can be made in the form of the invention without affecting the scope of the invention.

What I claim:

1. A packing-free, oil seal for a vertically-disposed shaft that is mounted in anti-friction bearings and extends through a continuously full oil reservoir and that comprises an annular projection which surrounds but is spaced outwardly from said shaft, said annular projection extending upwardly within said oil reservoir and acting to prevent direct contact between said shaft and the oil in said reservoir, a rotatable member that is secured to and rotatable with said shaft, said rotatable member being secured to said shaft so oil cannot pass between said rotatable member and said shaft, said rotatable member having a recess in the under side thereof that receives and telescopes down over the upper end of said annular projection, said recess being dimensioned relative to said annular projection to define a large normally empty, vertically-directed self-draining annular space between the sides of said recess and the sides of said annular projection, said rotatable member being so disposed relative to said annular projection as to form a horizontally-directed gap between the upper end of said recess and the upper end of said annular projection which is narrower than said annular gap and which enables said rotatable member and said annular projection to act upon oil attempting to pass therebetween and move said oil outwardly from said gap by centrifugal force.

2. A packing-free, oil seal for a vertically-disposed shaft that extends through a continuously full oil reservoir and that comprises an annular projection which surrounds said shaft, said annular projection extending upwardly within said oil reservoir to a point wholly above the level of the oil in said reservoir and acting to prevent direct contact between said shaft and the oil in said reservoir, a rotatable member that is secured to and rotatable with said shaft, said rotatable member being secured to said shaft so oil cannot pass between said rotatable member and said shaft, said rotatable member having a recess in the under side thereof that receives and telescopes down over the upper end of said annular projection, said recess being tapered so the lower end thereof has a larger diameter than the upper end thereof, said recess being dimensioned relative to said annular projection to define a large, normally empty, vertically-directed, self-draining annular space of frusto-triangular cross-section between the sides of said recess and the sides of said annular projection, said rotatable member being so disposed relative to said annular projection as to form a gap between the upper end of said recess and the upper end of said annular projection which is narrower than said annular gap and which enables said rotatable member and said annular projection to act upon oil attempting to pass therebetween and move said oil outwardly from said gap by centrifugal force.

CLARENCE O'DANIEL.

REFERENCES CITED

The following references are of record in the file of this patent:

UNITED STATES PATENTS

| Number | Name | Date |
| --- | --- | --- |
| 846,795 | Kruesi | Mar. 12, 1907 |
| 1,832,352 | Behan | Nov. 17, 1931 |
| 1,857,780 | Frappier et al. | May 10, 1932 |
| 2,042,575 | Worth | June 2, 1936 |
| 2,234,574 | Olcott | Mar. 11, 1941 |
| 2,277,526 | Mojonnier et al. | Mar. 24, 1942 |